United States Patent [19]

Johnson

[11] 4,319,817
[45] Mar. 16, 1982

[54] CAMERA HAVING BUILT-IN, CLOSE-UP LENS

[75] Inventor: Bruce K. Johnson, Andover, Mass.

[73] Assignee: Polaroid Corporation, Cambridge, Mass.

[21] Appl. No.: 215,235

[22] Filed: Dec. 11, 1980

[51] Int. Cl.³ .............................................. G03B 15/03
[52] U.S. Cl. .................................. 354/127; 354/149; 354/197
[58] Field of Search ............... 354/149, 197, 126–129, 354/139, 145, 187, 190

[56] References Cited

U.S. PATENT DOCUMENTS

| | | | |
|---|---|---|---|
| 2,034,978 | 3/1936 | Goldhammer | 354/190 |
| 3,253,528 | 5/1966 | Bing | |
| 3,318,215 | 5/1967 | Schiks | |
| 3,373,671 | 3/1968 | Jakob | |
| 3,479,942 | 11/1969 | Land et al. | |
| 3,598,031 | 8/1971 | Harvey | |
| 3,730,617 | 5/1973 | Werz et al. | 354/149 X |
| 3,747,490 | 7/1973 | Brandt | |
| 3,759,153 | 9/1973 | Aimo et al. | |
| 3,792,649 | 2/1974 | Douglas | 354/192 |
| 3,887,930 | 6/1975 | Bresson | 354/59 |
| 3,890,626 | 6/1975 | Ettischer | 354/197 |
| 3,893,137 | 7/1975 | Ettischer | 354/197 |
| 3,903,537 | 9/1975 | Ettischer | 354/197 |
| 3,961,349 | 6/1976 | Forsyth et al. | 354/295 |
| 3,962,711 | 6/1976 | Cutler | 354/295 |
| 4,032,939 | 6/1977 | Elton | 354/197 |
| 4,162,833 | 7/1979 | Plummer | 354/86 |
| 4,231,645 | 11/1980 | Davis et al. | 354/145 |

*Primary Examiner*—John Gonzales
*Attorney, Agent, or Firm*—Francis J. Caufield

[57] ABSTRACT

Camera apparatus of the type having an objective taking lens and an electronic flash movable between an erect operative position and a folded storage position is provided with a built-in, close-up lens arrangement for extending the focus range of the objective lens thus enabling a user to take pictures at nearer distances than would otherwise be possible using the camera objective lens alone. The close-up lens arrangement is structured for manual movement between a first position in which a close-up lens is in a storage location and a second position in which the close-up lens is captured and optically registered with the camera objective lens. The close-up lens can be released either manually or in response to movement of the electronic flash into its storage position. Upon release, the close-up lens automatically returns to its storage location.

8 Claims, 5 Drawing Figures

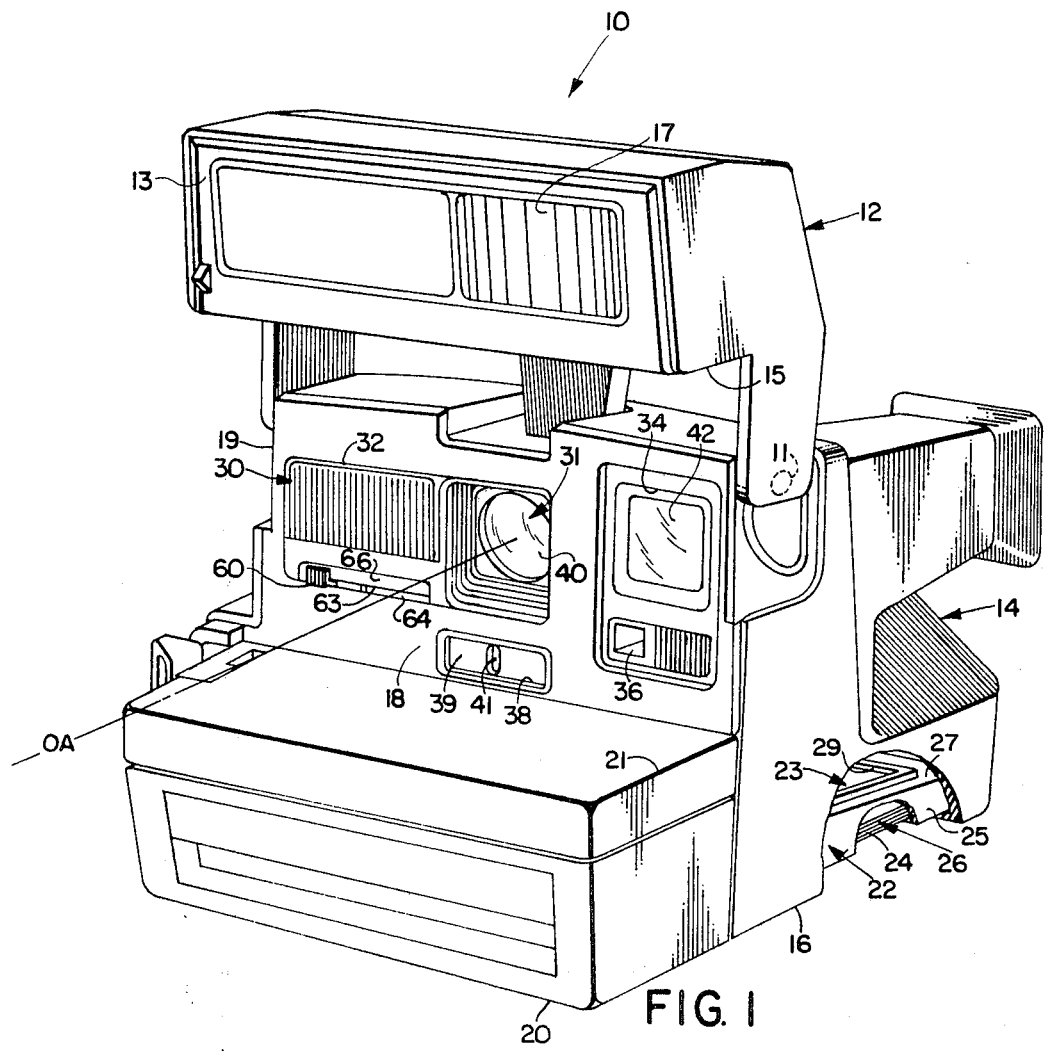
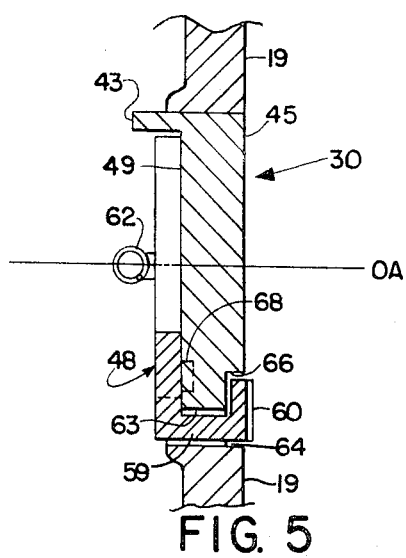
FIG. 1
FIG. 5

CAMERA HAVING BUILT-IN, CLOSE-UP LENS

BACKGROUND OF THE INVENTION

1. Field of the Invention

This invention in general relates to photography and in particular to camera apparatus having a built-in, close-up lens arrangement.

2. Description of the Prior Art

Photographic cameras of the type having exposure control systems that automatically operate to provide the correct amount of exposure delivered to a film under both natural and artificially created lighting conditions are well-known in the prior art. Under natural lighting conditions such cameras generally operate to provide proper exposure control over a predetermined range of scene brightnesses and under artificially created lighting conditions, such as those created by a built-in strobe or the like, operate to provide proper exposure over a predetermined range of subject distances related to the focus range of the camera objective taking lens system.

In cameras having fixed focus objective taking lens systems, the nearest distance at which properly exposed and sharply focused pictures can be obtained is determined by the near focus of the objective lens system even though proper exposure can generally be provided by the camera exposure control system for subjects located closer to the camera than the near focus of the camera objective taking lens system.

It is therefore a primary object of the present invention to provide a built-in, close-up lens arrangement for use with a camera having an automatic exposure control system to extend the near subject distances at which correctly exposed, properly focused pictures can be obtained.

It is another object of the present invention to provide a built-in, close-up lens arrangement for use with a camera of the type having an automatic exposure control system and a built-in foldable type electronic strobe such as that shown and described in considerable detail in U.S. Pat. No. 4,231,645 issued on Nov. 4, 1980 to Carl W. Davis et al. and entitled "Camera with Telescoping Dual Actuators". In this patent, a folding electronic strobe unit is mounted on a camera housing for movement between an erect operative position and a folded storage location.

The built-in, close-up lens arrangement of the present invention as described hereafter is particularly suitable for use with the type of camera structure disclosed in the Davis et al. patent and operates, inter alia, to automatically return a close-up lens to a storage location in response to folding the type of electronic strobe of Davis et al. into its storage location.

An example of a prior art camera having an optical lens system for automatically changing the focal distance of the objective lens in response to movement of an artificial lighting device between an operative and an inoperative position is shown and described in U.S. Pat. No. 3,598,031 issued to Donald M. Harvey on August 10, 1971 and entitled "Photographic Camera With Means For Varying A Focus Adjustment To Photograph An Artificially Illuminated Subject". Harvey, however, apparently provides no option for changing the focus of the lens and would not be suitable for use with a camera of the Davis et al. type. It is therefore another object of the present invention to provide a built-in, close-up lens arrangement of the type that can be optionally used to change the near focus of a camera having a built-in foldable artificial lighting device.

Other objects of the invention will in part be obvious and will in part appear hereinafter. The invention accordingly comprises the apparatus possessing the construction, combination of elements, and arrangement of parts which are exemplified in the following detailed disclosure.

SUMMARY OF THE INVENTION

This invention in general relates to photography and in particular to photographic camera apparatus having a built-in, close-up lens arrangement.

The photographic camera apparatus of the invention comprises a camera housing including means for facilitating the mounting of film in a plane for photoexposure and for defining a light path along which scene light can travel to the film mounting plane.

Also included is an objective taking lens mounted within the camera housing in registration with the light path and structured for directing scene light onto film located in the camera film mounting plane.

The camera apparatus of the invention includes a foldable flash unit that is mounted on the camera housing for movement between an operative erect position and a folded storage position.

Also provided in the invention is a supplementary lens structured for use with the objective taking lens so that the two in combination can focus on objects closer than would otherwise be possible with the objective taking lens acting alone.

The invention also includes means for mounting the supplementary lens for movement between a storage location in which the supplementary lens is not registered with the objective taking lens and an operative location in which the supplementary lens is in optical registration with the objective taking lens. The mounting means is structured so that the supplementary lens can be manually moved from its storage location to its operative location and thereafter either can be manually released, or released in response to the movement of the flash unit into its folded position, to automatically return to its storage location.

In a preferred embodiment the mounting means of the invention includes a thin, elongated block having a generally rectangular, elongated recess in one side thereof and an aperture in one end of the recess. The block and the camera housing have complementary structure for mounting the block with the camera housing such that the aperture of the block is in optical registration with the camera objective taking lens when the block is mounted with the camera housing to permit scene light to travel through the objective taking lens. The preferred mounting means also includes a lens carrier adapted to receive the supplementary lens and is structured for slidable movement within the block recess between a first position corresponding to the storage location of the supplementary lens and a second position corresponding to the operative location of the supplementary lens. The lens carrier also includes a lever which is adapted to extend to the exterior of the camera.

Also included in the preferred mounting means are means for biasing the lens carrier into its first position. The block, the lens carrier, and the biasing means are further structured to cooperate with one another to provide a detent arrangement by which the lens carrier automatically is captured in its second position as the lens carrier is moved from its first position toward its second position by pushing on the lens carrier lever and to release the lens carrier from its second position so that it automatically moves back to its first position under the influence of the biasing means in response to pushing on the lever either by hand or by contact with the flash unit upon movement of the flash unit into its storage position.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment when read in connection with the accompanying drawings wherein like numbers have been employed in the different figures to denote the same parts and wherein:

FIG. 1 is a left front perspective view of a camera embodying the present invention;

FIG. 5 is a sectional view taken generally along line 5—5 in FIG. 2.

DESCRIPTION OF THE PREFERRED EMBODIMENT

Figure 2:
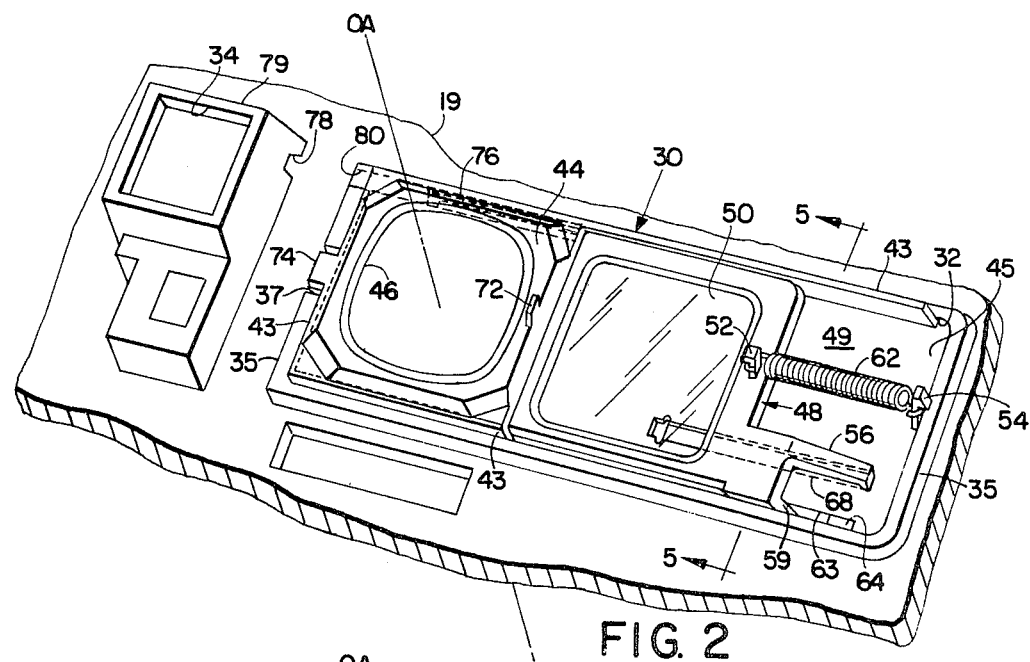
FIG. 2 is an enlarged right rear perspective view of part of the camera of FIG. 1.

The present invention relates to a close-up lens arrangement that is particularly suitable for use with a camera of the type having an automatic exposure control system and a foldable artificial lighting device. In its preferred embodiment, the present invention is shown incorporated in a virtually fully automatic type camera which utilizes self-processable type film and which is designated generally at 10 in FIG. 1.

As best seen in FIG. 1, the camera 10 includes an electronic flash unit 12, preferably of the quench type, mounted on a rigid body 14 for movement between an erect operative position, as illustrated in FIG. 1, and a folded inoperative position which is not illustrated. The rigid camera body 14 includes a generally prismatic shaped major housing 16, a generally L-shaped front housing 18, and a generally rectangularly-shaped film loading door 20 which collectively define its outward appearance and serve to house and protect its interior components. The aforementioned housings, 16 and 18, and the film loading door 20 are all preferably molded of an opaque plastic to preclude unwanted light from entering the camera interior.

The camera L-shaped housing 18 is defined, at least in part, by a plurality of camera housing walls including a forwardly facing wall 19 and an apron wall 21 extending forwardly from a bottom portion of the wall 19 in cooperation therewith to define a camera housing recess. The flash unit 12 has a housing that is defined, at least in part, by a plurality of flash unit housing wall exterior surfaces including an illumination source face surface 13 and an adjacent rearwardly extending bottom wall surface 15. A source of illumination, such as a flash output window 17 is mounted in the flash unit housing so that its light output is directed outwardly from the electronic flash unit 12 toward a scene. Well-known means including a pair of pivots 11 (only one shown) are provided for coupling the flash housing to the camera housing 14 for movement relative thereto between the operative erect position shown in FIG. 1 and its folded storage position (not shown) wherein a major portion of the flash housing fits into the camera housing recess previously defined. The flash housing and camera housing are configured such that the flash unit housing bottom wall surface 15 is substantially flush with the camera forwardly facing wall 19 when the flash unit 12 is folded. For a more detailed decription of the flash unit folding arrangement, reference may be had to U.S. patent application Ser. No. 054,598 filed in the name of Bruce K. Johnson on July 3, 1979 and entitled "Camera With Folding Flash Unit", now U.S. Pat. No. 4,268,146.

Formed in the base of the prismatic housing 16 is a well-known film cassette receiving chamber generally designated at 23. The chamber 23 is adapted to releasably hold a film cassette such as that designated at 22. The cassette 22 comprises a generally rectangular parallelepiped housing 25 which has an upwardly facing wall 27 having a generally rectangular aperture 29 therein. Mounted in registration with and biased toward the aperture 29 is a stacked array of integral type self-processable film units generally designated at 26. Each of the film units 26 has a given film speed requiring a predetermined exposure which is provided by the camera 10 in a manner to be described. Underneath the stacked array of film units 26 is a flat, thin battery 24 which is electrically coupled in a well-known manner to power the various electrical systems of the camera 10. An example of such a film cassette is described in considerable detail in U.S. Pat No. 3,872,487 issued to Nicholas Gold on Mar. 18, 1975 and entitled "Photographic Film Assemblage and Apparatus" and of such film units in U.S. Pat. Nos. 3,415,644; 3,594,165; and 3,761,268.

Formed in the vertical forwardly facing wall 19 of the L-shaped housing 18 are a number of apertures, designated at 32, 34, and 36, and an elongated slot 38. Mounted in registration with the aperture 32 is a close-up lens module 30 which includes an opening generally designated at 31. An objective taking lens 40 having an optical axis, OA, is optically registered behind the close-up lens module opening 31 and is positioned forwardly of an aperture formed in an opaque exposure chamber (not shown) that is positioned in a well-known manner inside the prismatic shaped housing 16 and also has a prismatic shape generally complementary to the interior shape of the housing 16. The objective taking lens 40 is of the fixed focus type and is optically structured in a well-known manner to have a depth of field from 4 ft. to infinity.

Located within the exposure chamber is a trapezoidal-shaped mirror (not shown) that is arranged at a predetermined angle with respect to the optical axis, OA, and the film plane to provide a folded light path of predetermined length therebetween along which image forming scene rays from the objective taking lens 40 travel to the film within the cassette 22 during a camera exposure cycle. The exposure chamber is of the type which is described in considerable detail in U.S. Pat. No. 4,057,815 issued to Bruce K. Johnson on Nov. 8, 1977 and entitled "Anti-Flare Structure for Photographic Optical System". It will be recognized by those skilled in the art that, with this type optical arrangement, the objective taking lens 40 and the peripheral edges of the film cassette aperture 29 cooperate to define the field of view of the camera 10, the field of view defining the subject matter that will be recorded during photoexposure.

Mounted in registration with the aperture 34 is a negative lens 42 which forms part of a reversed Galilean viewfinder that is structured in a well-known manner to have a field of view that is substantially coextensive with that of the camera 10 to facilitate aiming the camera 10 in order to frame the subject matter to be recorded in a picture.

The aperture 36, which is located just beneath the viewfinder entrance aperture 34, is provided for the purpose of admitting light to a radiometer (not shown) which forms a part of the automatic exposure control system of the camera 10.

Within the elongated slot 38 (FIG. 1) there is mounted a sliding member 39 having a button 41 thereon. The sliding member 39 is adapted for engagement with a light attenuating member (not shown) which operates in a well-known manner to permit a photographer to make minor adjustments in exposure.

Exposure of the film units 26 is regulated in a well-known manner through the use of an automatic exposure control system (not shown) of the type that is more fully described in U.S. patent application Ser. No. 074,993 filed on Sept. 13, 1979 in the name of Bruce K. Johnson et al. and entitled "Camera with Proportional Fill Flash Quench Strobe". The exposure control system described in the above-referenced U.S. Patent Application utilizes the output signal of the camera radiometer to control the firing of the electronic flash 12 so as to automatically provide a proportional fill flash under conditions where the natural or ambient scene lighting is of high intensity and may also control the firing of the electronic flash 12 under conditions of negligible ambient scene light intensity wherein the proportion of the exposure attributable to the artificial scene light provided by the electronic flash 12 automatically increases in correspondence with decreases in the ambient scene light intensity.

The exposure control system of the camera 10 is capable of regulating exposure under both ambient and artificial lighting conditions or combinations of both to provide proper exposure of the film units 26 at subject distances closer than the near focus (4 ft.) of the objective taking lens 40. The close-up lens module 30, in a manner to be described, provides a photographer with the option of taking pictures of subjects closer than the near focus of the objective taking lens 40.

Figure 4:
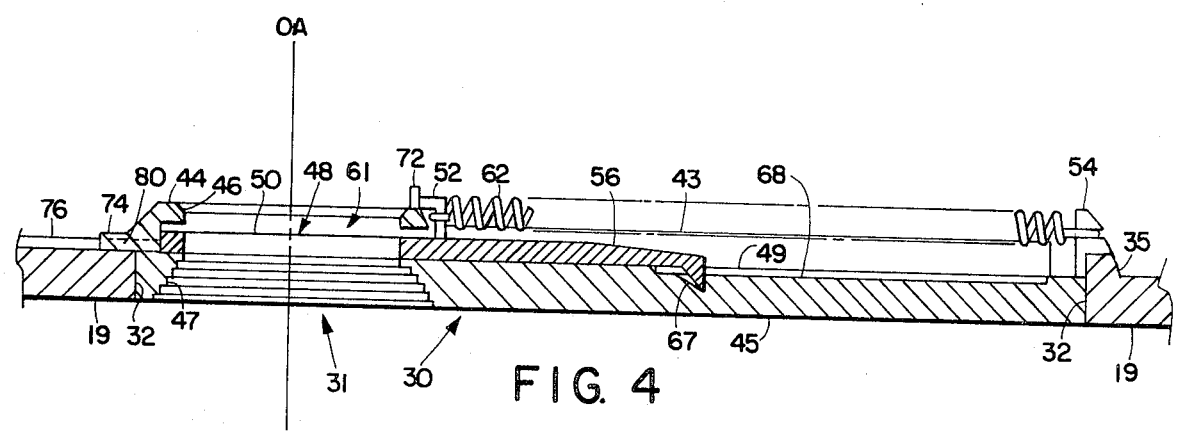
FIG. 4 is a sectional view taken generally along line 4—4 in FIG. 3.

Referring now to FIG. 2, there is shown the close-up lens module 30 of the invention disposed within the elongated aperture 32 that is formed in the forwardly facing wall 19 of the camera L-shaped housing member 18. The close-up lens module 30 comprises a thin, rectangularly-shaped, elongated block 45 that is dimensioned to fit snugly into the aperture 32. For purposes of connecting the close-up lens module 30 to the L-shaped camera housing member 18, the block 45 is provided with a tab 74 that fits into a recess 37 located in a rim 35 that surrounds the peripheral edges of the aperture 32. At the opposite end of the block 45 there is provided a snap-type lug fastener 54 that extends rearwardly from the block 45 and engages the upper surface of the rim 35 (FIG. 4). In this manner the close-up lens module 30 is provided with snap-type connectors which permit the close-up lens module 30 to be easily assembled with the camera housing structure.

Located in the bottom section of the block 45 is an elongated recessed edge surface 63 which, in combination with an edge portion of the peripheral rim of the aperture 32, defines a slot 64 (see FIGS. 1 and 5) through which extends a tab 59 connecting to a button 60 for purposes which will be explained hereinafter.

Figure 3:
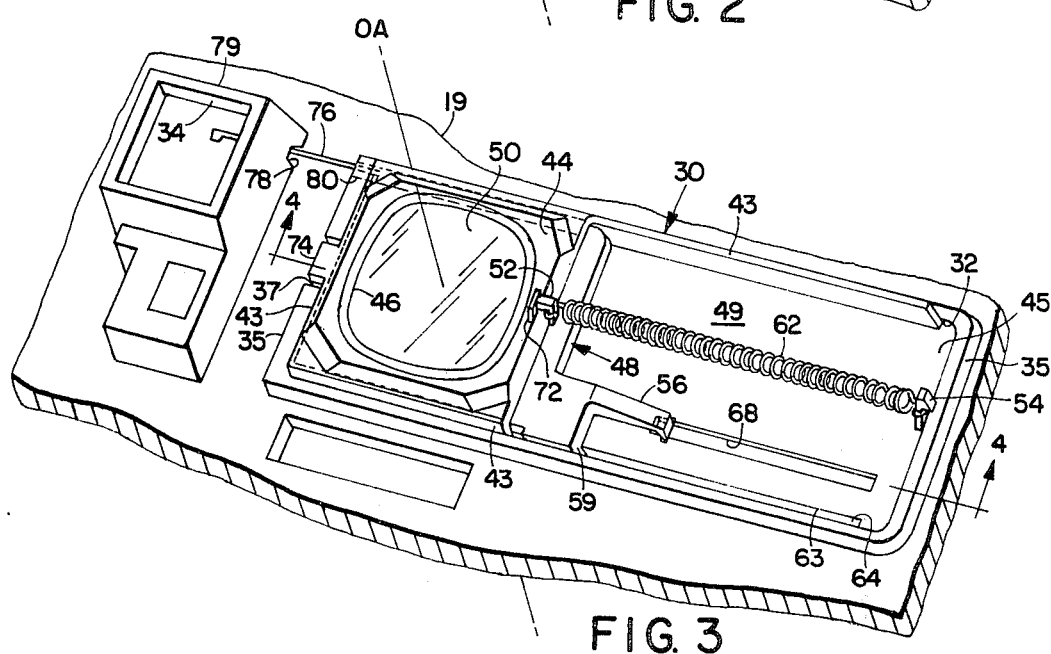
FIG. 3 is a view similar to FIG. 2 except showing part of the invention positioned differently than in FIG. 2.

As shown in FIG. 3, the block 45 includes a recessed surface 49 that is partially surrounded by an upwardly standing peripheral wall 43 having a cap portion 44 with an aperture 46 therein extending across the surface 49 in spaced apart parallel relation thereto. The cap portion 44 overlies a beveled serrated apertures 47 located in the front surface of the block 45 as best shown in FIG. 4 to define the opening 31 along the camera optical path. In this manner, there is provided on the left side of the block 45 a cavity 61 (see FIG. 4) adapted to receive therein a lens carrier 48 that is adapted in a well-known manner to receive a supplementary lens 50. The lens carrier 48 is structured for slidable movement on the block recess surface 49 between a first position as illustrated in FIG. 2 and a second position as illustrated in FIG. 3.

The supplementary lens 50 is optically structured in a well-known manner to, in combination with the objective taking lens 40, provide the camera with the ability to focus on objects whose distances are between 2-4 feet away from the camera 10 when the supplementary lens 50 via its carrier 48 is moved into its second position. When in its second position, the lens carrier 48 automatically aligns the supplementary lens 50 along the optical axis, OA, of the objective lens 40 as shown in FIG. 3 to perform this function.

One end of a spring 62 attaches to an upwardly extending boss 52 located on the lens carrier 48 and the opposite end of the spring 62 attaches to the upwardly standing lug snap connector 54. The spring geometry and rate are chosen so that the spring 62 provides a means for continuously biasing the lens carrier 48 into its first position as illustrated in FIG. 2.

Lens carrier 48 additionally includes a downwardly extending pawl 56 which rides in a slot 68 that is slightly recessed below the level of the surface 49. The end of the elongated slot 68 terminates in a triangularly-shaped notched out recess 67 (see FIG. 4) for receiving the trailing end of the pawl 56.

To move the lens carrier 48 from its first to its second position, a lever is provided on the lens carrier 48. The lever comprises a tab section 59 (see FIG. 5) that is perpendicular to the main bearing surface of the lens carrier 48 and extends through the slot 64 to terminate as the button 60 (FIGS. 1 and 5).

Located above the slot 64 (see FIG. 1 or FIG. 5) is an elongated recessed area 66 that is spaced rearwardly from the forwardly facing surface of the L-shaped housing wall 19. In moving the lens carrier 48 to its second position, a photographer simply pushes on the button 60 (see FIG. 1) to exert a force to the right. This causes the rear surface of the button 60 to slide along the forward surface of the recessed area 66 until the pawl member 56 drops into the recess 67 provided therefor. When the pawl 56 drops into the recess 67, the lens carrier 48 is automatically captured in its second position and the photographer may remove his finger from the button 60. Also, when the pawl 56 drops into the recess 67, the button 60 also moves toward the front of the camera 10 by a distance generally equal to the depth of the recess 67. The depth of the recess 67 and the pawl trailing end are dimensioned so that the button 60 protrudes beyond the L-shaped housing forwardly facing wall 19 when the lens carrier 48 is in its second position.

The lens carrier 48 can be released from its second position in one of two different ways. A photographer can push on the button 60 in a direction perpendicular to the direction in which the lens carrier 48 traveled in moving from its first to its second position. This action disengages the pawl 56 from the recess 67 thereby permitting the lens carrier 48 to be automatically moved back into its first position under the influence of the spring 62. Movement of the lens carrier 48 from its second position to its first position is stopped when the trailing end of the pawl 56 strikes up against the back wall of the elongated slot 68 (FIG. 4).

The other way in which the lens carrier 48 can be caused to be released from its second position is by folding the electronic flash unit 12 into its storage location as previously described. Folding of the electronic flash unit 12 into its storage location causes the housing surface 15 thereof to strike the button 60 to drive the button 60 towards the rear of the camera 10. When the button 60 is driven in this manner, the pawl 56 as before is disengaged from the recess 67 and the lens carrier 48 automatically returns to its first position in the manner previously described.

It will be appreciated by those skilled in the art that the pushing force on the button 60 to move the lens carrier 48 into its second position in alignment with the objective taking lens 40 in combination with the force exerted on the lens carrier 48 by the spring 62 as this is done creates a moment or couple acting on the lens carrier 48. This couple tends to cause the pawl 56 to press against the slot 68 as the lens carrier 48 travels from its first to its second position. This action enhances the reliability of the detent capturing arrangement for retaining the lens carrier 48 in its second position because the trailing end of the pawl 56 is biased towards the recess 67 and will automatically drop into the recess 67 when sufficiently clear of the edge of the recess 67. To enhance this action, there is also provided an upwardly standing tab section 72 that is located on the capping block portion 44. The tab section 72 is provided so that the boss 52 strikes it as the lens carrier 48 is moved toward its second position. This creates an interference causing another couple effect to occur on the lens carrier 48. This other coupling effect also tends to rotate the trailing end of the pawl 56 into the recess 67.

The lens carrier 48 is also provided with an elongated flag member 76 which extends through a hole 80 located in the upper left-hand corner of the block 40 as best shown in FIG. 3. In line with the hole 80 is another hole 78 that is located in a cone-like structure 79 which, in part, defines the viewfinder aperture 34. Movement of the lens carrier 48 causes the flag 76 to extend through first the hole 80 and then through the hole 78 to provide a visual indication or signal in the viewfinder of the camera 10 to alert a photographer that the supplementary lens 50 is in its operative location.

Both the elongated block 45 and the lens carrier 48 are preferably integrally molded of a suitable plastic material so that there are only two major parts to assemble. In the case of the lens carrier 48, the plastic material preferably is an optical plastic so that the supplementary lens 50 can easily be molded as part of the overall structure of the lens carrier 48 through the use of suitable optically polished mold inserts in the tool for fabricating the lens carrier 48.

Certain changes may be made in the above-described embodiment without departing from the scope of the invention and those skilled in the art may make still other changes according to the teachings of the disclosure. Therefore, it is intended that all matter contained in the above description or shown in the accompanying drawings shall be interpreted as illustrative and not in a limiting sense.

What is claimed is:

1. Photographic camera apparatus comprising:

a camera housing including means for facilitating the mounting of film in a plane for photoexposure and for defining a light path along which scene light can travel to said film mounting plane;

an objective taking lens mounted within said camera housing in registration with said light path and structured for directing scene light onto film located in said camera film plane;

a foldable flash unit mounted on said camera housing for movement between an operative erect position and a folded storage position;

a supplementary lens structured for use with said objective taking lens so that the two in combination can focus on objects closer than would otherwise be possible with said objective taking lens acting alone; and means for mounting said supplementary lens for movement between a storage location in which said supplementary lens is not registered with said objective taking lens and an operative location in which said supplementary lens is in optical registration with said objective taking lens, said mounting means being structured so that said supplementary lens can be manually moved from its storage location to its operative location and thereafter either can be manually released, or released in response to the movement of said flash unit into its folded position, to automatically return to its storage location.

2. The apparatus of claim 1 wherein said mounting means comprises:

a thin, elongated block having a generally rectangular, elongated recess in one side thereof and an aperture in one end of said recess, said block and said camera housing having complementary structure for mounting said block with said camera housing such that said aperture of said block is in optical registration with said camera objective taking lens when said block is mounted with said camera housing to permit scene light to travel through said objective taking lens;

a lens carrier adapted to receive said supplementary lens and structured for slidable movement within said block recess between a first position corresponding to said storage location of said supplementary lens and a second position corresponding to said operative location of said supplementary lens, said lens carrier including a lever which is adapted to extend to the exterior of said camera; and means for biasing said lens carrier into its first position;

said block, said lens carrier and said biasing means being further structured to cooperate with one another to provide a detent arrangement by which said lens carrier automatically is captured in its second position as said lens carrier is moved from its first position toward its second position by pushing on said lens carrier lever and to release said lens carrier from its second position so that it automatically moves back to its first position under the influence of said biasing means in response to pushing on said lever either by hand, or by contact with said flash unit upon moving into its storage position.

3. The apparatus of claim 2 wherein said block, said lens carrier, and said biasing means are structured so that movement of said lens carrier between its first and second position is effected by pushing on said lens carrier lever in a direction in which said lens carrier moves in traveling from its first toward its second position and so that release of said lens carrier is effected by pushing said lens carrier lever in a direction perpendicular to the direction of travel of said lens carrier.

4. The apparatus of claim 1 wherein said camera is of the type having a viewfinder and wherein said apparatus further includes means by which a visual signal is provided in the viewfinder to alert a photographer that said supplementary lens is in its operative location.

5. The apparatus of claim 4 wherein said camera housing and said mounting means both include complementary snap type fasteners by which said mounting means snap connects with said camera housing.

6. The apparatus of claim 1 wherein said mounting means comprises:

a lens carrier adapted to fixedly receive said supplementary lens and having affixed thereto a lever of predetermined geometry;

guide means adapted to slidably receive said lens carrier for movement between a first position corresponding to said storage location of said supplementary lens and a second position corresponding to said operative location of said supplementary lens, and so that said lever extends to the exterior of said camera apparatus during movement of said lens carrier; and means for biasing said lens carrier into its first position, said lens carrier, said guide means, and said biasing means being further structured to cooperate with one another to provide a detent arrangement by which said lens carrier automatically is captured in its second position as said lens carrier is moved from its first position toward its second position by pushing on said lens carrier lever and to release said lens carrier from its second position so that it automatically moves back to its first position under the influence of said biasing means in response to pushing on said lever either by hand, or by contact with said flash unit upon moving into its storage position.

7. The apparatus of claims 2 or 6 wherein said guide means and said lens carrier are further structured so that movement of said lens carrier from its first toward its second position is effected by pushing on said lever thereof in the direction in which said lens carrier travels in moving from its first to its second position and so that release of said lens carrier is effected by pushing on said lever in a direction perpendicular to the direction of travel of said lens carrier.

8. The apparatus of claims 3 or 6 wherein said lens carrier lever and said biasing means are configured and arranged with respect to one another so that a pushing force exerted on said lens carrier lever to move said lens carrier from its first to its second position creates a couple acting on said lens carrier which tends to rotate said lens carrier into its detent arrangement.

* * * * *